Feb. 26, 1935.  H. NUTT  1,992,626
CLUTCH PLATE
Filed July 20, 1931  2 Sheets-Sheet 1

Inventor:
Harold Nutt
By Wm. O. Bell
Atty.

Feb. 26, 1935.   H. NUTT   1,992,626
CLUTCH PLATE
Filed July 20, 1931   2 Sheets-Sheet 2

Inventor:
Harold Nutt
By Wm. D. Bell, Atty.

Patented Feb. 26, 1935

1,992,626

UNITED STATES PATENT OFFICE 1,992,626

CLUTCH PLATE

Harold Nutt, Chicago, Ill., assignor to The Borg & Beck Company, Chicago, Ill., a corporation of Illinois Application July 20, 1931, Serial No. 552,038

17 Claims. (Cl. 192—107)

This invention relates to friction clutches and more especially to the clutch or driven plate which is interposed between two parts of a driving member and is adapted to be gripped or clamped by said parts under sufficient pressure to impart motion from the driving member to a driven shaft on which the clutch plate is mounted. The invention is particularly useful in friction clutches for automobiles but is not limited thereto and may be used in other clutch assemblies with satisfactory results.

The object of the invention is to yieldingly support the facings on the clutch plate so that there will be, as nearly as possible, full contact between the facings and the gripping or clamping parts of the driving member and an equal distribution of pressure and of cushion resistance by the plate over the entire area of the facings at initial engagement and throughout the engagement of these parts.

Another object is to avoid high pressure areas on the clutch plate facings and to effect a substantially even distribution of pressure and of cushion resistance by the plate by yieldingly mounting the facings in parallel relation on closely spaced and substantially radial contact lines on the plate whereby the facings will make full contact with the gripping or clamping parts of the driving member at initial engagement and continue in full contact and with a uniform distribution of pressure and cushion resistance over the entire area of the facings throughout the engagement.

And a further object is to enable initial contact of one edge of the clutch plate facings with the gripping or clamping parts of the driving member and a gradual increase of contact radially of the facings as the pressure plate load is increased.

In the accompanying drawings illustrating a selected embodiment of the invention Fig. 1 is a side elevation of the clutch plate showing the friction facings broken away.

Figure 1:
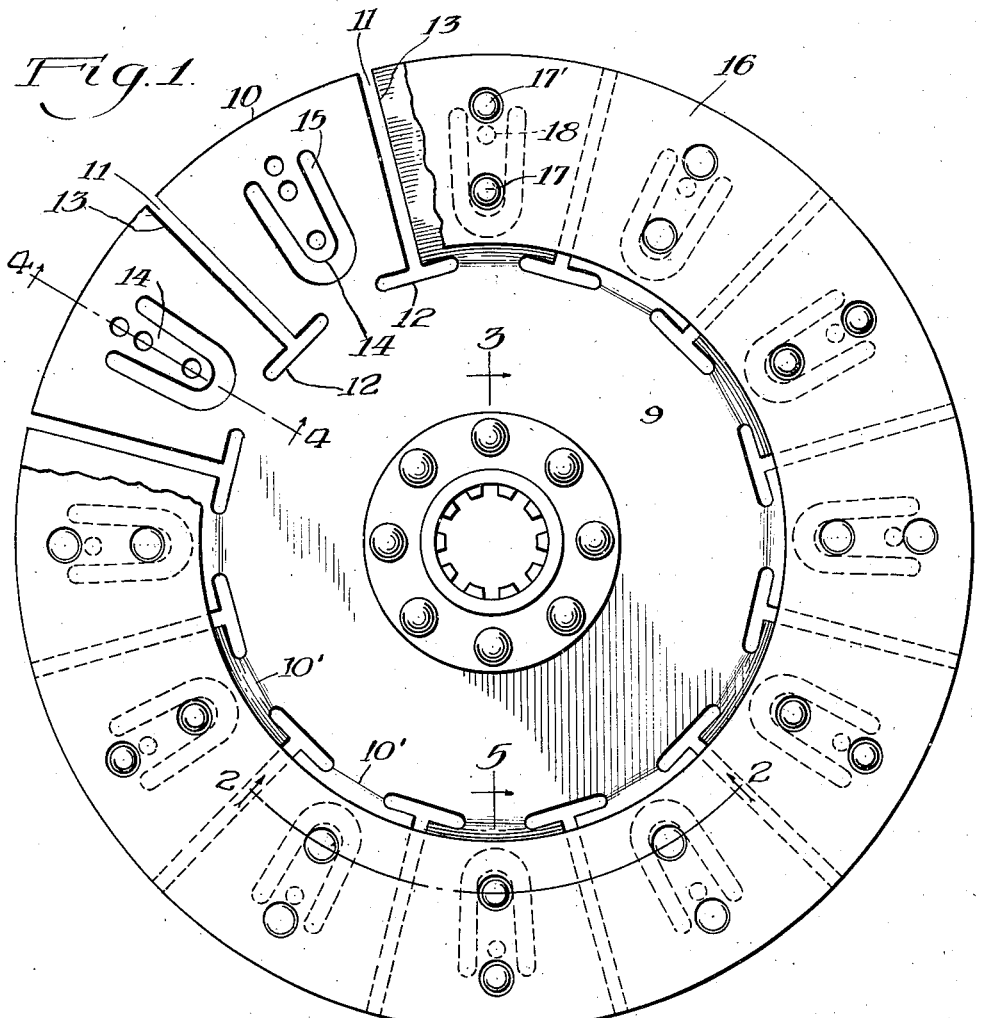
Figure 2:
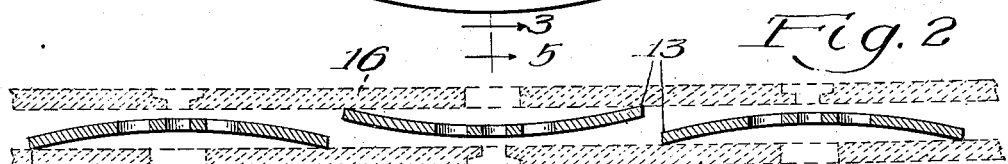
Fig. 2 is a sectional view of the plate on the line 2—2 of Fig. 1 showing the shape and position of the sectors before fastening the friction facings in place.
Figure 2A:
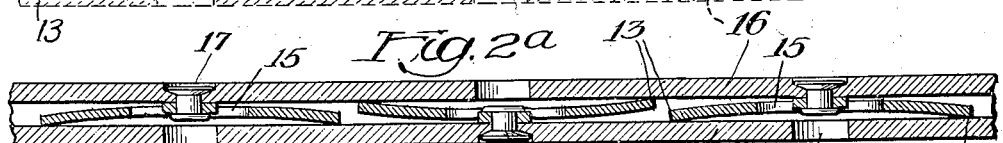
Fig. 2a is a sectional view on the line 2—2 of Fig. 1 showing the facings in place.
Figure 2B:
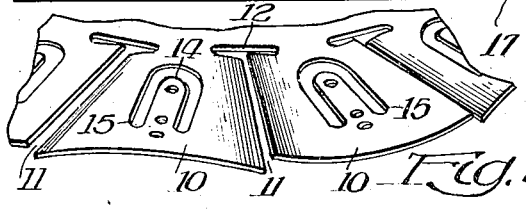
Fig. 2b is a perspective view of a portion of the plate showing the shape and position of the sectors before fastening the friction facings in place.
Figure 3:
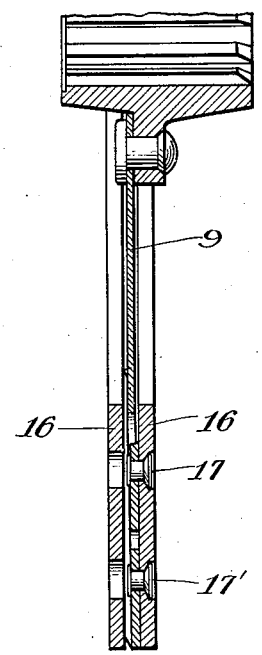
Fig. 3 is a sectional view on the line 3—3 of Fig. 1.
Figure 4:
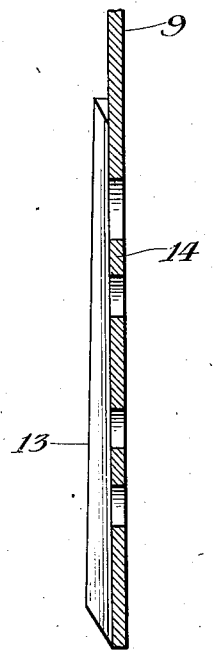
Fig. 4 is an enlarged central sectional view on the line 4—4 of Fig. 1.
Figure 5:
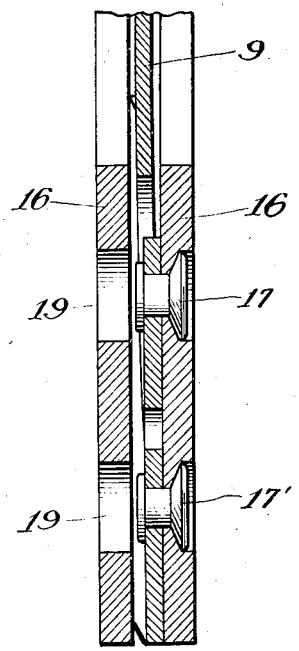
Fig. 5 is an enlarged sectional view on the line 5—5 of Fig. 1.

Referring to the drawings, the clutch plate 9 is divided into a plurality of sectors 10 by radial slots 11 which, in the preferred form of the invention as shown in Fig. 1, extend through the periphery of the plate and connect at their inner ends with transverse slots 12 at or about the middle thereof to form T-shaped slots separating the sectors. The sectors are bent transversely and alternately to offset the side edges of the sectors on opposite sides of the plate. Each sector is bent on a smaller radius at its inner end than at its outer end and each sector is thus given the shape of a section of a frustum of a conical shell, Fig. 2b, with the side edges offset more at their outer ends than at their inner ends, Fig. 4. A radially disposed and inwardly directed tongue 14 is formed in each sector by cutting a slot 15 in the sector and this slot may be generally described as U-shaped. Continuous friction facings 16 are fastened to the tongues of alternate sectors by rivets 17. The facings are arranged on opposite sides of the plate in engagement with the offset edges 13 on the concave side of alternate sectors and slightly out of contact with the middle portion and tongue on the convex side of the other sectors, Fig. 2, and then the facings are fastened to the tongues at the convex sides of the sectors. The facings are sufficiently hard so that they will not yield to the rivets and the rivets snugly secure the tongues to the facings and bend the tongues slightly, and this also results in slightly flattening the sectors as indicated in Fig. 2a and also in very slightly bending the sectors bodily at the narrow neck 10' between the slots 12, 12 as shown in Fig. 1. For wide facings two rivets are used for each sector, one rivet 17 being located near the end of the tongue and the other rivet 17' being located near the base of the tongue, Fig. 1. For narrow facings only one rivet for each sector may be found sufficient if located in the intermediate opening 18. Clearance openings 19 are provided in the facings to facilitate assembly of the parts and to receive the inner heads of the rivets when the plate is under pressure. The yieldability of the sectors may be increased by enlarging the U-shaped slots. The extent of the bend at the neck 10' is equal to the difference in the depth of the sectors at the inner and outer ends of the sectors. The side edges of the sectors contact radially with the facings from the inner edges to the outer edges of the facings. The side edges of a sector contact with one facing and the central portion of the same sector, which includes the tongue, contacts with the opposite facing uniformly along a radial line extending substantially from the inner edge to the outer edge of the facing. Thus each sector provides three radial lines of contact for supporting the facings, two on one side and one intermediate on the other side. These three contact line supports are in parallel planes and remain in parallel planes during the entire cushion range of the facing. The improved plate not only provides for full contact with the clamping members of the clutch but also for uniform cushion resistance at closely spaced radii across the entire width of the facings; and this desirable condition is obtained without the necessity of making sharp breaks or sudden bends in the sectors which would tend to produce high pressure areas and uneven and ununiform cushion resistance. Referring to Figs. 3 and 5 it will be noted that the facings are parallel with the body or general plane of the plate; the right facing being in snug contact with the tongue and the intermediate part of the sector between the tongue and the periphery of the plate, and the left facing being in snug contact with the side edges of the sector. This is because the bend of the sector at the neck 10' and the inclination of the side edges 13 of the sector are in direct proportion when the facings are mounted on the plate and the parallel relation of the facings is not only provided when the plate is not under pressure but is maintained while the plate is under pressure because the central part of the sector and the side edges thereof will yield to substantially the same extent under pressure.

If it is not important or desired to have full contact at initial engagement, and progressive contact is preferred, the sectors are bent on a shorter radius at their outer ends so that the side edges will be higher, as shown at 20, when the facings are applied than in the construction shown in Figs. 3 and 5, and the facings will be spread farther apart at their outer diameter than at their inner diameter. Therefore, the clamping members of the clutch will contact initially with the facings at the outer edges thereof and this contact will progressively increase radially of the facings with the increase of pressure of the clamping members.

Figures 6, 7, 8:
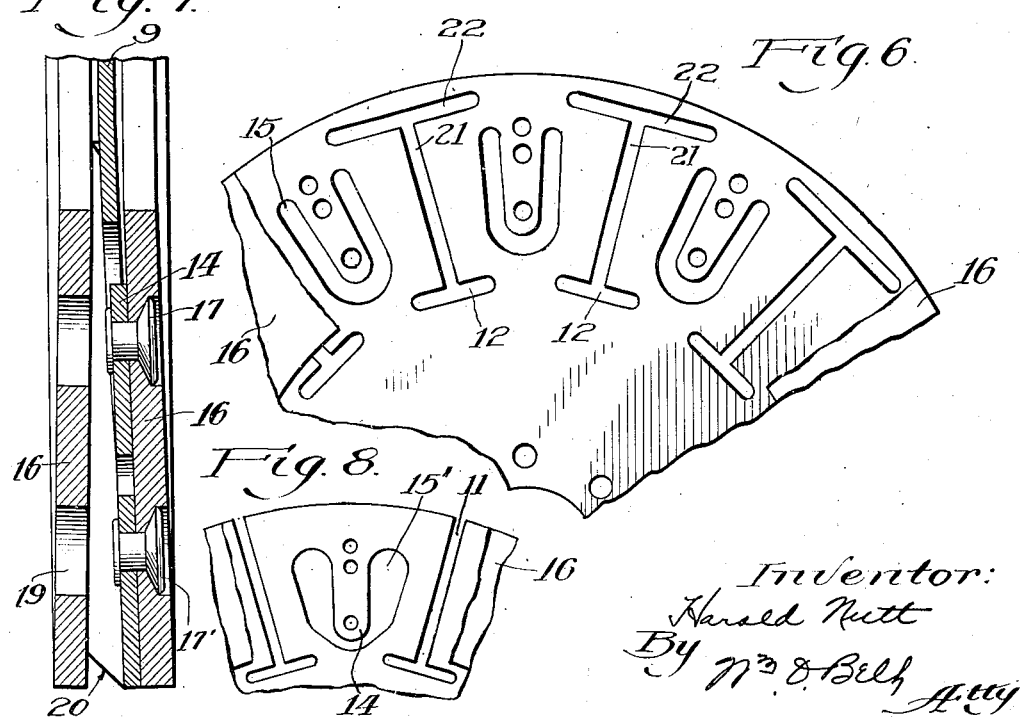
Fig. 6 is a fragmentary plan view showing a modified form of plate with the facings broken away.
Fig. 7 is a sectional view similar to Fig. 5 with the facings supported for initial peripheral edge engagement with the gripping or clamping parts of the driving member.
Fig. 8 is a detail view showing another modification of the invention.

In Fig. 6 I have shown a modified form of the invention wherein the radial slots 21 which form the sectors do not extend through the periphery of the plate, as in Fig. 1, but connect at their outer ends with transverse slots 22 within and adjacent the periphery of the plate. These outer transverse slots 22 are shown somewhat longer than the inner transverse slots 13 and they are parallel with the inner slots but either or both slots may be made arcuate if desired and their lengths may vary as may be required to satisfy different conditions. The alternate bodily bends of the sectors will cause slight bends in the continuous marginal edge of the plate and these bends will occur opposite the slots 22. In other respects the plate of Fig. 6 is constructed and will function in the manner described with reference to the plate of Fig. 1. The U-shaped slots 15 provide a relief for the stresses and strains of the metal of the sectors in the engaging and disengaging movements of the clutch and make the sectors more flexible and mount the facings more yieldingly than has been the practice in plates of this general type. The yielding effect and flexibility of the sectors may be increased by enlarging the slots as shown at 15' in Fig. 8.

My invention provides a clutch plate of simple and novel construction which will avoid grabbing or jerking in action, which will take hold smoothly and evenly throughout the contact area of the facings, which will avoid ununiform wear and chatter, and which will prolong the life of the clutch plate. The plate construction produces a uniform distribution of the clamping pressure and the cushion resistance throughout the contacted area of the facings and not only provides for full initial contact of the facings when desired but also for even yieldability throughout the contact area of the facings. And it is an important feature of the invention that the plate is constructed to give this uniform yieldability for the facings by avoiding sharp bends in the plate which tend to produce unyielding corners and high pressure areas.

I do not limit the invention to the selected embodiments illustrated in the accompanying drawings but reserve the right to make any changes therein that may be necessary or desirable to adapt it for different clutch assemblies or for other purposes within the scope of the following claims.

I claim:

1. A clutch plate having a plurality of spaced integral sectors, said sectors being alternately and oppositely bent transversely and substantially into the form of sections of a frustum of a conical shell.

2. A clutch plate radially slotted to provide a plurality of spaced integral sectors, said sectors being alternately and oppositely bent transversely and substantially into the form of sections of a frustum of a conical shell.

3. A clutch plate radially slotted to provide a plurality of spaced sectors, said sectors being alternately and oppositely bent transversely and substantially into the form of sections of a frustum of a conical shell and each of said sectors being bent on a shorter radius at its inner end than at its outer end.

4. A clutch plate having radial slots and transverse slots at the inner ends of said radial slots, said slots providing a plurality of spaced sectors and narrow necks connecting said sectors to the central part of the plate, each of said sectors being bodily bent at its neck to incline in a straight line on one side of the plate from the plane of the central part of the plate, and a friction facing mounted on said sectors in parallel relation to the central part of the plate.

5. A clutch plate having radial slots and transverse slots at the inner ends of said radial slots, said slots providing a plurality of spaced sectors and narrow necks connecting said sectors to the central part of the plate, each of said sectors being bent bodily at its neck to incline in a straight line from the plane of the central part of the plate, the side edges of each sector being offset from the plane of its central portion to a greater extent at its outer end than at its inner end, and a friction facing supported upon said side edges of said sectors and uniformly movable in parallel relation with the central part of said plate.

6. A clutch plate having radial slots and transverse slots at the inner ends of said radial slots, said slots providing a plurality of spaced sectors and narrow necks connecting said sectors to the central part of the plate, said sectors being alternately and oppositely bent transversely, the side edges of each sector being offset from the plane of its central portion to a greater extent at its outer end than at its inner end, and said sectors being bodily bent at said necks.

7. A clutch plate having a plurality of spaced sectors, said sectors being bent transversely and substantially into the form of sections of a frustum of a conical shell, and a pair of friction facings supported in parallel relation upon the side edges of said sectors.

8. A clutch plate having a plurality of spaced sectors, the side edges of said sectors being parallel to the central part of said plate and the intermediate portion of said sectors being inclined to the central part of said plate, and a pair of friction facings supported in parallel relation upon the side edges of said sectors and uniformly movable in parallel relation toward each other.

9. A clutch plate having a plurality of spaced sectors, said sectors being alternately and oppositely bent arcuately and transversely into the form of sections of a frustum of a conical shell, and a pair of friction facings supported in parallel relation upon the side edges of said sectors and uniformly movable in parallel relation toward each other.

10. A clutch plate having a plurality of spaced sectors, said sectors being bodily bent transversely and being bent radially to incline in a straight line to the central part of said plate, and a pair of friction facings operatively engaging said sectors and parallel to each other, each of said facings engaging the side edges of one sector and the central portion of the next sector alternately, said bent sectors providing an equal distribution of pressure and of cushion resistance throughout the operative engagement of said plate.

11. A clutch plate radially slotted to provide a plurality of spaced sectors, said sectors being bent transversely into the form of sections of a frustum of a conical shell, and a pair of friction facings operatively engaging said sectors, each of said facings engaging the side edges of one sector and the central portion of the next sector alternately.

12. A clutch plate having a plurality of spaced sectors, said sectors being alternately and oppositely bodily bent transversely and alternately and oppositely inclined in a straight line to the central part of said plate, and a pair of friction facings operatively engaging said sectors and parallel to each other, each of said facings engaging the side edges of one sector and being fastened to the central portion of the next sector alternately.

13. A clutch plate having a plurality of spaced sectors, said sectors being alternately and oppositely bodily bent transversely and inclined in a straight line to the central part of said plate, inwardly directed tongues located between the side edges of said sectors, and a pair of friction facings operatively engaging said sectors and parallel to each other, each of said facings engaging the side edges of one sector and being fastened to the tongue in the next sector alternately.

14. A clutch plate having a plurality of spaced sectors, said sectors being alternately and oppositely bent transversely and substantially into the form of sections of a frustum of a conical shell, inwardly and radially directed tongues located between the side edges of said sectors, and a pair of friction facings operatively engaging said sectors, each of said facings engaging the side edges of one sector and being fastened to the tongue in the next sector alternately.

15. A clutch plate having a plurality of spaced sectors, said sectors being alternately and oppositely bent transversely and substantially into the form of sections of a frustum of a conical shell and said sectors being bent to incline in a straight line to the central part of said plate, the central portion of each sector having a substantially U-shaped slot forming an inwardly directed tongue, and a pair of friction facings operatively engaging said sectors, each of said facings engaging the side edges of one sector and being fastened to the tongue of the next sector alternately.

16. A clutch plate having a plurality of spaced sectors, said sectors being alternately and oppositely bent transversely and substantially into the form of sections of a frustum of a conical shell and each of said sectors having an inwardly directed tongue located between its side edges, and a pair of friction facings operatively engaging said sectors on radial lines including the side edges of the sectors and a medial line of each sector between said side edges.

17. A clutch plate having a plurality of radial slots terminating in transversely disposed slots at their inner ends and forming spaced sectors, said sectors being bent transversely and each sector having an inwardly directed tongue disposed between its side edges, and a pair of friction facings supported upon said sectors, each of said facings engaging the side edges of one sector and the central portion including the tongue of the next sector alternately and being fastened to said tongues, and each sector being bent bodily between said transverse slots to compensate for the difference in the offset of the outer ends as compared with the inner ends of said side edges from the plane of the body of the plate and said tongues being slightly bent, whereby said facings are supported in parallel relation for uniform movement in parallel relation.

HAROLD NUTT.